United States Patent [19]

Giachino et al.

[11] 4,386,453

[45] * Jun. 7, 1983

[54] METHOD FOR MANUFACTURING VARIABLE CAPACITANCE PRESSURE TRANSDUCERS

[75] Inventors: Joseph M. Giachino, Farmington Hills; Russell J. Haeberle, Canton; Joseph W. Crow, Livonia, all of Mich.

[73] Assignee: Ford Motor Company, Dearborn, Mich.

[*] Notice: The portion of the term of this patent subsequent to Apr. 14, 1998, has been disclaimed.

[21] Appl. No.: 313,107

[22] Filed: Oct. 20, 1981

Related U.S. Application Data

[60] Continuation of Ser. No. 160,403, Jun. 17, 1980, which is a division of Ser. No. 72,506, Sep. 4, 1979, Pat. No. 4,261,086.

[51] Int. Cl.³ .............................................. H01G 5/16
[52] U.S. Cl. .................................. 29/25.41; 361/278; 361/279; 361/283
[58] Field of Search ........................... 29/25.41, 25.42; 73/718, 724; 361/283, 278, 279, 285, 326, 328, 271

[56] References Cited

U.S. PATENT DOCUMENTS 3,328,653   6/1967   Wolf, Jr. .
3,397,278   8/1968   Pomerantz .
3,417,361   12/1968  Heller et al. .
3,634,727   1/1972   Polye ............................... 361/283
3,697,917   10/1972  Orth et al. .
3,858,097   12/1974  Polye .
3,993,939   11/1976  Slavin et al. .
4,025,942   5/1977   Kurtz .
4,168,518   9/1979   Lee ................................... 361/283
4,261,086   4/1981   Giachino et al. .................. 29/25.41

OTHER PUBLICATIONS

"The Design of an Integrated Circuit Capacitive Pressure Transducer"; T. M. Grill; Jan. 1978.

Primary Examiner—Carl E. Hall
Attorney, Agent, or Firm—Peter Abolins; Clifford L. Sadler

[57] ABSTRACT

A method for manufacturing variable capacitance pressure transducers and an intermediate article of manufacture produced in the practice of this method. In the method, a wafer of doped silicon or other semiconductor material has portions of the semiconductor material removed from spaced areas to form a plurality of recesses in the surface of the semiconductor material. The material is doped to enhance its electrical conductivity. A dielectric material has one of its surfaces coated with spaced areas of electrically conductive material. The semiconductor material is attached to the coated surface of the dielectric material such that the surface recesses in the semiconductor material are in alignment with the conductive areas on the dielectric material. This produces a plurality of electrical capacitors suitable for use as pressure transducers. The capacitance of these transducers is varied as a function of changes in one or more fluid pressures acting in the plates of each of the capacitors, one of these plates being the doped semiconductor material and the other being a conductive area on the dielectric material. Fluid pressure between the plates may be established during manufacture. The intermediate article of manufacture produced by this process may then be cut into a plurality of separate pressure transducers.

8 Claims, 3 Drawing Figures

METHOD FOR MANUFACTURING VARIABLE CAPACITANCE PRESSURE TRANSDUCERS

This is a continuation of application Ser. No. 160,403, filed June 17, 1980, which is a division of Ser. No. 72,506, filed Sept. 4, 1979, now U.S. Pat. No. 4,261,086 issued Apr. 14, 1981.

CROSS-REFERENCES TO RELATED APPLICATIONS

This invention is related to our concurrently filed and commonly-assigned patent applications Ser. No. 72,536 now abandoned entitled "Semiconductor Variable Capacitance Pressure Transducer" and Ser. No. 72,503, now U.S. Pat. No. 4,277,814 issued Jul. 7, 1981 entitled "Semiconductor Variable Capacitance Pressure Transducer Assembly" and Ser. No. 239,850 filed on Mar. 2, 1981, a continuation of Ser. No. 72,536, entitled "Semiconductor Variable Capacitance Pressure Transducer".

BACKGROUND

This invention relates to a method for manufacturing variable capacitance pressure transducers and to an intermediate article of manufacture produced in the practice of the method. The pressure transducers are suitable for use in sensing either absolute or gage pressures or pressure differentials. The intermediate article of manufacture comprises an aggregation of pressure-sensitive electrical capacitors which may be separated to provide individual paired or otherwise grouped pressure transducers.

Recently, motor vehicle applications have required the use of pressure sensors for measuring both ambient and subatmospheric pressure levels. In internal combustion engine applications, fine control of fuel metering has required that the rapidly-fluctuating pressure levels within the intake manifold of the engine be measured as well as the less-rapidly fluctuating ambient pressure levels. Sensors able to measure these pressures reliably and with adequate response time have been difficult to obtain and are very expensive. Perhaps the best pressure sensor thus far available is of the ceramic pressure transducer type. This variable capacitance sensor has a thick ceramic element on which is deposited a metal film. A second and very thin ceramic plate or diaphragm also has a metal film deposited on it and is attached with a glass frit or the like to the thicker ceramic element. The metal films on the ceramic element constitute the plates of a capacitor. The thin ceramic diaphragm responds to pressure variations to produce a small change in capacitance that is used to vary the frequency produced by an electronic oscillator.

Sensors or transducers of the type described in the preceding paragraph are expensive because of their large size and because they must be manufactured individually. Also, a ceramic pressure transducer of this type may not be tested until it has been assembled with its associated electronic circuitry. If it is found to be defective, the entire assembly then must be discarded.

A pressure transducer that could be manufactured by batch-processing techniques is a desirable device. Also desired is a pressure transducer that is of small size and that can be tested prior to assembly with electronic circuitry that may be associated with the device to produce a signal proportional to the pressure detected by the transducer element. The pressure tranducer should be inexpensive with respect to the materials utilized, should be reliable and should be inexpensive as compared to prior art devices. Moreover, the pressure sensor should be easily calibrated, should be mass producible at low cost and should provide an accurate and reproducible variable parameter in response to fluctuations in the pressure to be sensed. Desirably, the pressure transducer should be manufacturable for use over various pressure ranges.

The method of the present invention and the intermediate article of manufacture produced thereby may be used in the manufacture of pressure tranducers having rapid response times and to provide the desired characteristics mentioned above.

CITATION OF RELATED ART

Case Western Reserve University has been working under contract with the assignee of the present invention on the development of variable capacitance pressure tranducers. In January, 1978, Thomas Mark Grill of that University submitted a thesis in partial fulfillment of the requirements of the Degree of Master of Science. The thesis was entitled "The Design of an Integrated Circuit Capacitance Transducer" intended for "in vivo biomedical applications". The thesis states that "the heart of the transducer is a pressure sensitive capacitor". One plate of the capacitor is a diaphragm that is etched into the silicon substrate with a 4 microns deep cavity in the top surface. The other plate is a metalized Pyrex cover that is electrostatically sealed to the silicon substrate over the cavity thus forming a totally enclosed chamber. To obtain a DC voltage proportional to the value of the pressure sensitive capacitor, an FET bridge is driven by a squarewave. The pressure sensitive capacitor and a reference capacitor are then charged and discharged through the bridge. The work done by Case Western Reserve University under contract with the assignee of this invention has been subsequent to the submission of the Grill thesis and has been under the direction of one or more of the present inventors.

U.S. Pat. Nos. 4,025,942 describes a low pressure transducer and methods of fabricating the same. The transducer comprises piezoresistive bridges deposited on or diffused within a wafer or slice of N-type silicon. The wafer or slice then is bonded, with the use of an anodic or diffusion bonding technique, to a glass sheet. The composite structure then is scribed or cut to separate the bridge circuit patterns into individual cells. The bridge circuit composite cell then is attached to a much larger silicon diaphragm with the use of an inorganic bonding technique similar to that used to bond the wafer to the glass before scribing.

U.S. Pat. No. 3,417,361 describes semiconductive pressure transducer comprising a pressure enclosure formed as a unitary structure of mechanically homogeneous semiconductive material. The stress-sensitive element of the transducer is a single crystal circular diaphragm having a diffused surface layer electrically isolated from the body of the diaphragm by a rectifying junction.

U.S. Pat. No. 3,858,097 describes a capacitance type pressure transducer comprising a hollow body having spaced opposing walls supported at their edges. Electrically conducting means on the deflectable portions of the walls form the plates of a pressure sensitive capacitor. The hollow body is made of a dielectric material, such as glass or quartz.

U.S. Pat. No. 3,993,939 describes a pressure responsive diaphragm attached to a substrate that carries a thick film metallic coating. The coating is covered by a dielectric glass so that the diaphragm and thick film coating comprise a pressure variable capacitor. Changes in pressure cause the diaphragm to roll against the glass thereby varying the area of contact and the capacity.

U.S. Pat. No. 3,328,653 describes a thin-film pressure transducer comprising a fixed electrode sandwiched between a very thin, flexible, upper layer of dielectric material and a rigid base layer of dielectric material. The upper layer carries a thin film of metal opposite the fixed electrode.

U.S. Pat. No. 3,397,278 describes an anodic bonding technique suitable for use in bonding an inorganic insulator element to a metallic element. Specifically, bonding of borosilicate glass and a semiconductor, such as silicon, is accomplished.

U.S. Pat. No. 3,697,917 describes a pressure transducer that utilizes a silicon strain gage diaphragm as a pressure sensor. The diaphragm is bonded to a tubular glass support by an anodic bonding process.

SUMMARY OF THE INVENTION

The method of the invention provides a variable capacitance pressure transducer, as well as a novel intermediate article of manufacture. In the practice of the method, a wafer of semiconductor material has a surface from which portions of the semiconductor material are removed to form a plurailty of recesses in the surface of the semiconductor material. The material then is doped, at least in the regions of the recesses, to enhance its electrical conductivity in such regions. On a surface of the dielectric material, spaced areas of electrically conductive material are formed. The surface of the semiconductor material having the spaced, recessed areas then is attached to the surface of the dielectric material such that the surface recesses in the semiconductor material are in adjacent, spaced and substantially parallel alignment with areas of electrically conductive material on the dielectric material. This forms a plurality of electrical capacitors. Each of the capacitors has doped semiconductor material as one of its plates and has another plate thereof that comprises at least one of the electrically conductive areas. The capacitance of the capacitors is variable as a function of changes in one or more fluid pressures acting on the plates of one of the electrical capacitors.

The intermediate article of manufacture produced by the use of the above manufacturing steps comprises a dielectric material attached to a semiconductor material wafer, these materials together having a plurality of capacitive elements each of which includes doped semiconductor material as one of its plates and metal or other conductive material deposited on the dielectric material as the other of its plates. The individual capacitor units that comprise this intermediate article of manufacture may be separated by scribing or cutting to form individual capacitive pressure transducers.

The invention may be better understood by reference to the detailed description which follows and to the drawing.

DETAILED DESCRIPTION

Figure 1:
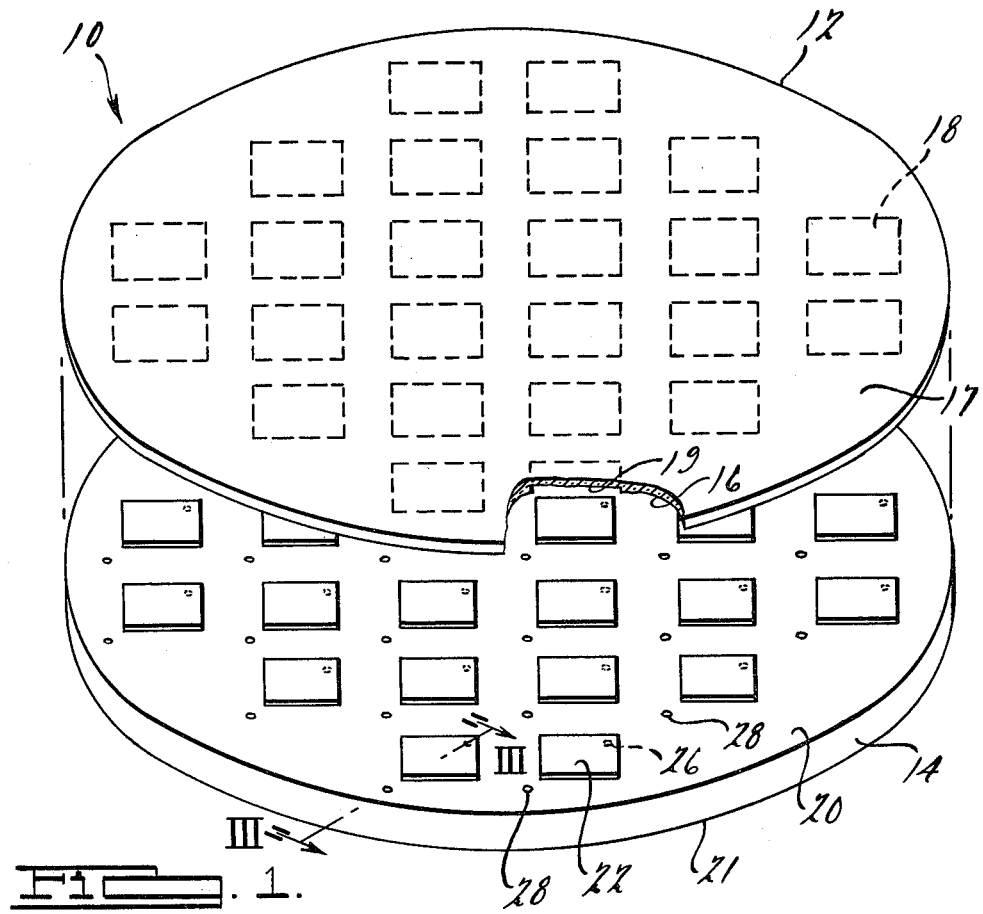
FIG. 1 is an enlarged, exploded view of an intermediate article of manufacture in accordance with the invention comprising a wafer of semiconductor material and a dielectric material having spaced conductive areas on one of its surfaces.

With particular reference now to the drawings, wherein like numerals refer to like parts in the several views, there is shown in FIG. 1 an exploded view of an intermediate article of manufacture that may be produced with the use of the method described herein. The intermediate article of manufacture is generally designated by the numeral 10. It comprises a semiconductor silicon wafer 12 and a dielectric material 14. The semiconductor material 12 preferably is single crystal silicon semiconductor material having a 100 plane orientation. The dielectric material 14 preferably is a borosilicate glass such as is obtainable from the Corning Glass Works under the trademark "Pyrex" and may be of the type designated 7740.

The semiconductor material has opposite surfaces 16 and 17. The distance between these surfaces 16 and 17 or, the thickness of the semiconductor material 12, may be selected as required for the application of the pressure transducer to be reduced, but a thickness of about 135 microns has been found satisfactory. On the other hand, the glass dielectric material 14 may have a thickness of about 1.50 mm. This is much thicker than the semiconductor material thickness, and thicknesses of these materials being deliberately distorted in the drawings to allow illustration.

The semiconductor material 12 has recesses 18 in the semiconductor material that are formed by the removal of a portion of the semiconductor material from spaced areas on the surface 16 of the semiconductor material. This produces surfaces 19 that define reduced-thickness areas of the semiconductor material and that define the volume of the recesses 18. The recesses 18 preferably are formed by etching the surface 16 of the semiconductor material to a depth in each of the recess areas 18 of about four microns. The etch may be accomplished with the use of standard photographic or other techniques that define the spaced surface areas 19 that when etched define the recesses 18 in the semiconductor material. The area of each of the recesses 18 may be on the order of about 20.25 mm$^2$. The etching may be accomplished with a solution comprised of eight parts hydrazine mixed with 2 parts of deionized water. When applied to the silicon semiconductor material having the 100 crystal orientation previously mentioned, the etched areas will be square with edges of 4.5 mm providing areas of about 20.25 mm$^2$.

The semiconductor material 12 preferably is heavily doped with P-type or N-type material to enhance its electrical conductivity. Preferred is a boron dopant that provides P-type conductivity of the semiconductor material. The semiconductor material is doped at least in the regions of the spaced areas 19 which form the recesses 18 in the semiconductor material, thereby, to make the semiconductor material underlying the surfaces 19 electrically conductive. The process step of doping the semiconductor material to enhance its electrical conductivity in and around the surfaces 19 may be accomplished either before or after the step of etching the semiconductor material 12 to form the recesses 18, but it is preferred that the doping take place after the etching step.

The glass dielectric material 14 has surfaces 20 and 21. The surface 20 has deposited on its spaced areas of electrically conductive material 22. These square areas are somewhat smaller in area than the recessed areas 18 in the semiconductor material, are intended upon bonding of the semiconductor material 12 to the dielectric material 14 to be centrally aligned with the recesses 18 in the semiconductor material without contacting the semiconductor material, and are applied by vapor deposition of aluminum or other electrically conductive material to the surface 20 of the glass. Other known techniques for applying thin films of conductive material also may be used to produce the conductive films 22 on the surface 20 of the glass dielectric material.

The glass dielectric material 14 has a plurality of holes formed in it. There are two holes 26 and 28 associated with each of the plurality of capacitive pressure transducers formed by the intermediate article of manufacture comprising the semiconductor wafer 12 and the dielectric material 14 and its associated conductive areas which are spaced apart from one another on one surface of the dielectric material. The holes 26 and 28 preferably are produced in the dielectric material using known ultrasonic, abrasive or laser drilling techniques. The drilled hole 26 penetrates the thickness of the glass dielectric material 14 and the spaced conductive area 22 thereon with which the hole 26 is associated. Similarly, the hole 28 is drilled to penetrate the glass dielectric material but is located at a position spaced from the conductive material 22 so that it will be in a position with regard to the surface 16 of the semiconductor material that will allow a conductive material deposited in the hole 28 to come into electrical contact with the semiconductor surface 16. A conductive material also is placed in the drilled hole 26 to form electrical contact with the conductive surface area 22. It is preferred that the drilled holes 26 and 28 be formed in the dielectric material 14 after the spaced conductive areas 22 are deposited thereon and before the semiconductor material 12 is attached thereto. Also, the assembly of these materials is intended to be cut along the regions between the recesses 18 in the manner integrated circuits conventionally are cut from wafers of semiconductor material. This produces a plurality of individual capacitive pressure transducers each comprising one of the recesses, one of the conductive areas 22 on the dielectric material, and a portion of the semiconductor material and dielectric material, respectively, surrounding the recesses 18 and the conductive areas 22. The conductive material in the hole 28 contacts the highly doped, essentially fully conductive surface 16 of the semiconductor material. Conductive material in the hole 26 allows electrical contact to be made to conductive area 22.

The conductive material formed in the holes 26 and 28 may be obtained by deposit of Hanovia bright platinum. This material is available from England Industries, Inc., and is a metallo-organic solution. It is deposited in the holes 26 and 28, and allowed to dry. This leaves a residue of metallic salts on the surfaces of the hole, and, preferably, in the immediate area on the surfaces of the dielectric material and conductive areas 22 through which the holes 28 and 26 penetrate. Subsequent heating of the salts deposited in the holes causes them to decompose into a metal film that is electrically conductive.

Preferably, the semiconductor wafer 12 is bonded to the dielectric material 14 to form the article of manufacture 10 prior to the time the salts in the holes 26 and 28 are heated to produce the decomposition thereof mentioned above. The bonding may be accomplished with the use of an anodic bonding technique, such as one of those described in the aforementioned U.S. Pat. Nos. 3,697,917 to Orth et al; 3,397,278 to Pomerantz; or 4,025,942 to Kurtz. The anodic or diffusion bonding techniques described in these patents are especially suitable for bonding silicon semiconductor material to glass of the type suggested for use herein, but other bonding techniques known to those skilled in the art also may be used to produce adhesion of the surface 16 of the semiconductor material 12 to the surface 20 of the glass dielectric material 14.

Figures 2, 3:
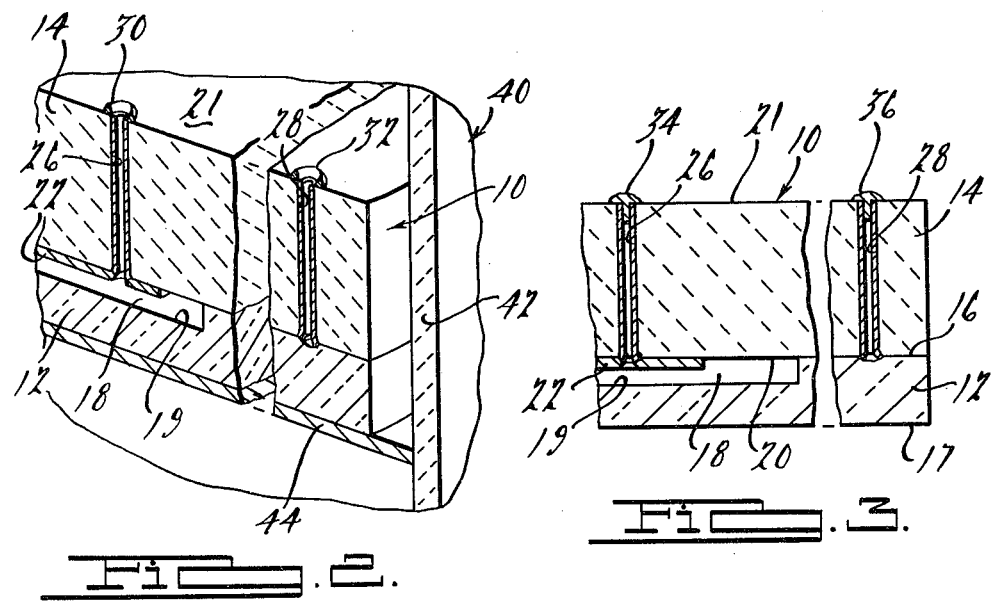
FIG. 2 is a further-enlarged, partial sectional view of the intermediate article of manufacture positioned in a container that would allow a predetermined pressure to be established within each of the confined volumes formed between the recessed areas in the surface of the semiconductor material and the surface of the dielectric material.
FIG. 3 is an enlarged sectional view of a portion of one of the capacitive transducer elements formed in the intermediate article of manufacture.

With particular reference to FIG. 2, there is shown the article of manufacture 10 in partial enlarged sectional view. The article 10 is shown in a bell jar 40 or similar device, which has a shelf or the like 44 for supporting the article 10. While the article 10 could be cut to produce individual capacitive pressure transducer assemblies prior to being placed in the bell jar 40, it is preferred that the cutting take place after this for efficiency of processing. In the bell jar, the conductive material in the holes 26 and 28 is heated to produce its decomposition and thereby to produce a conductive film or coating on the interior surfaces of the holes. If desired, either one or both of the holes is sealed. In order to achieve the seal, rings 30 and 32 of solder, or equivalent deposits of solder or other sealing material, are deposited adjacent the openings of the holes at their entry points into the surface 21 of the dielectric material 14. Upon being heated, the solder rings 30 and 32 melt and flow by capillary attraction into the respective holes 26 and 28 to form seals therein. In the bell jar 40, a predetermined pressure may be established in the recess areas 18 that are defined by the dielectric material 14 surface, the conductive material 22 thereon, and the surface 19 of the semiconductor material previously etched into it.

FIG. 3 depicts the article of manufacture 10 after the holes 26 and 28 have been sealed with the solder rings 30 and 32 melted to form solder heads or bumps 34 and 36, which may be used in a flip-chip technique for soldering or adhering the capacitive pressure transducer to a thick-film support as is disclosed in a copending application of the inventors.

The predetermined pressure level established in the recessed area 18 determines the pressure responsive range of the capacitive pressure transducer. If the transducer is to be used to produce a capacitive variation in response to changes in absolute pressure, then it is desirable to evacuate the recessed areas 18 through the holes 26 prior to heating of the solder ring 30 that seals the hole. The evacuation may be carried out in the bell jar or the equivalent in which the article of manufacture 10, or individual pressure transducers cut therefrom, are placed. In any case, the capacitance of each of the capacitive pressure transducers is variable as a function of changes in one or more fluid pressures acting on the plates of each of the electrical capacitors. One of these plates comprises the semiconductor material defined by the area 19. The other plate, spaced from the first plate, comprises one of the conductive areas 22 on the glass dielectric material 14. The pressure in the recessed area or volume 18 opposes the force acting on the surface 17 of the semiconductor material, which force is a function of the fluid pressure to which this surface is exposed. Pressures acting on the surface 21 of the glass dielectric material produce very little deflection thereof as compared to the deflection of the semiconductor material 12 in the area 19.

Based upon the foregoing description of the invention, what is claimed is:

1. A method for manufacturing a variable capacitance pressure transducer, comprising the steps of:
   (a) from at least one area on a surface of a wafer of semiconductor material, removing a portion of the semiconductor material in the area to form at least one recess in the surface of the semiconductor material;
   (b) doping the semiconductor material, at least in the region of the recess, to enhance its electrical conductivity in such region;
   (c) forming a path of electrically conductive material connecting two spaced surfaces of a dielectric member through a hole extending between said two spaced surfaces; and
   (d) anodically bonding the surface of said wafer containing said recess to one surface of said dielectric member to form a bonding area which provides an hermetic seal around the recess, said bonding area being such that the hole in the dielectric member is spaced from said recess in the semiconductor material and the path of electrically conductive material provides an electrical connection through said hole to the semiconductor material in said banding area.

2. A method for manufacturing a variable capacitance pressure transducer, comprising the steps of:
   (a) from at least one area on a surface of a wafer of semiconductor material, removing a portion of the semiconductor material in the area to form at least one recess in the surface of the semiconductor material;
   (b) doping the semiconductor material, at least in the region of the recess, to enhance its electrical conductivity in the region;
   (c) forming an area of conductive material on the surface of a dielectric member having first and second surfaces and a hole formed between said two surfaces;
   (d) forming a path of electrically conductive material between said two surfaces of the dielectric member through said hole; and
   (e) anodically bonding the surface of the semiconductor material to the surface of the dielectrical member such that the surface recess of the semiconductor material is in adjacent, spaced and substantially parallel alignment with the area of electrically conductive material on the dielectric member, thereby, to form an electrical capacitor, the capacitor having doped semiconductor material as one plate thereof spaced from another plate thereof comprising the electrically conductive area, the capacitance of the capacitor being variable as a function of changes in a fluid pressure acting on at least one of the plates of the capacitor, the anodic bonding of the surface of the semiconductor material to the surface of the dielectric member with the area of conductive material being such that the bond provides an hermetic seal around said recess and such that the hole in the dielectric member is spaced from the recess in the semiconductor material and the path of electrically conductive material provides an electrical connection to the semiconductor material through the dielectric member at said bond.

3. A method for manufacturing a variable capacitance pressure transducer as recited in claim 2 further comprising the step of sealing the hole in the dielectric member at the surface opposite the anodic bond by placing a sealant adjacent the hole, heating the conductive sealant to cause it to liquify and to flow into the adjacent hole, and allowing the conductive sealant to solidify to form a seal in the hole.

4. A method for manufacturing a variable capacitance pressure transducer as recited in claim 3 wherein the semiconductor material is formed of silicon, the dielectric member is formed of glass and the hole is formed by drilling.

5. A method for manufacturing a variable capacitance pressure transducer, comprising the steps of:
   (a) from at least one area of a surface of a wafer of semiconductor material, removing a portion of the semiconductor material in the area to form at least one recess in the surface of the semiconductor material;
   (b) doping the semiconductor material, at least in the region of the recess, to enhance its electrical conductivity in the region;
   (c) on a surface of a dielectric member forming an area of conductive material;
   (d) in a first hole and a second hole formed through the dielectric member between two surfaces of the dielectric member, the first hole being at a location spaced from the area of conductive material and the second hole being at a location intersecting the area of conductive material, forming a path of electrically conductivity between the two surfaces of the dielectric member; and
   (e) anodically bonding the surface of the semiconductor material to the surface of the dielectric member such that the surface recess of the semiconductor material is in adjacent, spaced and substantially parallel alignment with the area of electrically conductive material on the dielectric member, thereby, to form an electrical capacitor, the capacitor having doped semiconductor material as one plate thereof spaced from another plate thereof comprising the electrically conductive area, the capacitance of the capacitor being variable as a function of changes in fluid pressure acting on the plates of the capacitor, and the anodic bonding of the surface of the semiconductor material to the surface of the dielectric member with the area of conductive material being such that the first hole in the dielectric member is spaced from the recess in the semiconductor material and the path of electrically conductive material provides an electrical connection to the semiconductor material through the dielectric member at the bond formed by said anodic bonding which provides a hermetic seal around the recess and the second hole being aligned so as to be positioned within the side boundaries of the recess.

6. A method for manufacturing a variable capacitance pressure transducer as recited in claim 5 further comprising the steps of:

establishing a predetermined pressure between the plates of the capacitor;

sealing the holes in the dielectric member by placing a conductive sealant adjacent each of the holes while the dielectric member is subjected to the predetermined pressure, heating the conductive sealant to cause it to liquify and to flow into the adjacent hole, and allowing the conductive sealant to solidify to form a seal in the hole while the predetermined pressure is maintained between the plates of the capacitor associated with the second hole until the sealing of the second hole is completed.

7. A method of manufacturing a variable capacitance pressure transducer as recited in claim 6 including the steps of:

drilling the first hole through the dielectric member at a location spaced from where the electrically conductive material is located or is to be located and forming a first electrical conductor within the first hole suitable for providing electrical contact to the semiconductor material; and drilling the second hole through the dielectric member in the area where the electrically conductive material is located or is to be located and forming a second electrical conductor within the second hole thus drilled through the dielectric member, the second electrical conductor in the second hole upon completion of the manufacturing method providing electrical contact to the electrically conductive material on the dielectric member surface.

8. A method for manufacturing a variable capacitor pressure transducer as recited in claim 6 wherein the electrical conductor in the holes is formed by applying a solution of a metal compound in the holes, drying the solution to leave a metal compound deposit on the surfaces defining the holes, and heating the metal compounds to cause them to decompose, thereby to form a first continuous electrical conductor for interconnection of the metal in the first hole with the semiconductor material and to form a second continuous electrical conductor for interconnection of the metal in the second hole with the electrically conductive area on the dielectric member surface.

* * * * *